(12) United States Patent
Fan et al.

(10) Patent No.: US 8,767,636 B2
(45) Date of Patent: Jul. 1, 2014

(54) SCHEDULING IN WIRELESS NETWORKS

(75) Inventors: Rui Fan, Beijing (CN); Rong Hu, Sollentuna (SE); Min Wang, Lulea (SE)

(73) Assignee: Optis Cellular Technology, LLC, Plano, TX (US)

( * ) Notice: Subject to any disclaimer, the term of this patent is extended or adjusted under 35 U.S.C. 154(b) by 278 days.

(21) Appl. No.: 12/674,335

(22) PCT Filed: Aug. 21, 2007

(86) PCT No.: PCT/SE2007/000738
§ 371 (c)(1),
(2), (4) Date: Feb. 19, 2010

(87) PCT Pub. No.: WO2009/025592
PCT Pub. Date: Feb. 26, 2009

(65) Prior Publication Data
US 2011/0182248 A1    Jul. 28, 2011

(51) Int. Cl.
*H04W 4/00*    (2009.01)

(52) U.S. Cl.
USPC ...... 370/329; 370/395.42; 370/412; 370/326; 370/252; 370/519; 455/450; 709/238

(58) Field of Classification Search
CPC .................................................. H04L 47/283
USPC ................ 370/329, 395.42, 412, 242, 252; 455/450; 709/238
See application file for complete search history.

(56) References Cited

U.S. PATENT DOCUMENTS

| | | | |
|---|---|---|---|
| 5,961,599 A * | 10/1999 | Kalavade et al. | 709/224 |
| 6,693,912 B1 * | 2/2004 | Wang | 370/401 |
| 6,701,149 B1 * | 3/2004 | Sen et al. | 455/436 |
| 6,807,156 B1 * | 10/2004 | Veres et al. | 370/252 |
| 7,058,042 B2 * | 6/2006 | Bontempi et al. | 370/338 |
| 7,099,275 B2 | 8/2006 | Sarkinen et al. | |
| 7,174,180 B2 | 2/2007 | Andrews et al. | |
| 7,245,915 B2 * | 7/2007 | Matta et al. | 455/436 |
| 7,450,514 B2 * | 11/2008 | Suh | 370/235.1 |
| 7,616,585 B1 * | 11/2009 | Kritov et al. | 370/252 |

(Continued)

FOREIGN PATENT DOCUMENTS

| | | |
|---|---|---|
| EP | 1 643 690 A1 | 4/2006 |
| JP | 2004-40786 A | 2/2004 |

(Continued)

OTHER PUBLICATIONS

International Search Report dated May 16, 2008 (5 pages).

(Continued)

*Primary Examiner* — Andrew Lai
*Assistant Examiner* — Andrew C Lee
(74) *Attorney, Agent, or Firm* — Vincent J. Allen; Carstens & Cahoon, LLP

(57) ABSTRACT

A basic idea is to determine scheduling priorities of users based on information representative of experienced end-to-end quality of user communication in an overall network, and allocate communication resources in a wireless sub-network (100; 200) of the overall network to users based on the determined scheduling priorities. For example, the sub-network (100; 200) may be a wireless access network within an overall network, and end-to-end quality information related to the overall network may then be taken into account in the local scheduling procedure in the access network.

20 Claims, 11 Drawing Sheets

(56) References Cited

U.S. PATENT DOCUMENTS

| | | | |
|---|---|---|---|
| 7,623,483 B2* | 11/2009 | Yi et al. | 370/328 |
| 7,664,126 B2 | 2/2010 | Funato | |
| 7,746,779 B2 | 6/2010 | Bi et al. | |
| 2001/0027490 A1* | 10/2001 | Fodor et al. | 709/238 |
| 2002/0114305 A1* | 8/2002 | Oyama et al. | 370/338 |
| 2003/0063562 A1 | 4/2003 | Sarkinen et al. | |
| 2003/0212999 A1* | 11/2003 | Cai | 725/119 |
| 2003/0223429 A1 | 12/2003 | Bi et al. | |
| 2004/0146067 A1* | 7/2004 | Yi et al. | 370/474 |
| 2004/0240390 A1* | 12/2004 | Seckin | 370/252 |
| 2005/0099943 A1* | 5/2005 | Naghian et al. | 370/229 |
| 2005/0153725 A1* | 7/2005 | Naghian et al. | 455/520 |
| 2005/0286422 A1 | 12/2005 | Funato | |
| 2006/0019662 A1 | 1/2006 | Andrews et al. | |
| 2006/0039280 A1* | 2/2006 | Anandakumar et al. | 370/229 |
| 2006/0050705 A1* | 3/2006 | Kim | 370/392 |
| 2006/0067269 A1 | 3/2006 | Jugl et al. | |
| 2006/0111119 A1* | 5/2006 | Iochi | 455/450 |
| 2006/0146833 A1* | 7/2006 | Roberts et al. | 370/395.42 |
| 2006/0153216 A1* | 7/2006 | Hosein et al. | 370/412 |
| 2007/0121542 A1* | 5/2007 | Lohr et al. | 370/329 |
| 2007/0223491 A1* | 9/2007 | Baek et al. | 370/395.21 |
| 2007/0248075 A1* | 10/2007 | Liu et al. | 370/349 |
| 2007/0274284 A1* | 11/2007 | Dendukuri et al. | 370/351 |
| 2007/0283025 A1* | 12/2007 | Yi et al. | 709/228 |
| 2009/0028054 A1* | 1/2009 | Kumar et al. | 370/242 |

FOREIGN PATENT DOCUMENTS

| | | |
|---|---|---|
| JP | 2006-502653 A | 1/2006 |
| WO | WO 2004/019521 A1 | 3/2004 |
| WO | WO 2004/034726 A1 | 4/2004 |
| WO | WO 2006/032988 A1 | 3/2006 |
| WO | WO 2006/055173 A2 | 5/2006 |
| WO | WO 2006/065174 A1 | 6/2006 |
| WO | WO 2006/130270 A1 | 12/2006 |
| WO | WO 2008/002228 A1 | 1/2008 |

OTHER PUBLICATIONS

Written Opinion dated May 16, 2008 (4 pages).

Cristina Comaniciu et al., "Wireless Access to the World Wide Web in an Integrated CDMA System", IEEE Transactions on Wireless Communications, vol. 2, No. 3, May 2003, pp. 472-483 (12 total pages).

Pablo José et al., "Packet Scheduling and Quality of Service in HSDPA", Ph. D. Thesis, Oct. 2003 (192 total pages).

H. Schulzrinne et al., "RTP: A Transport Protocol for Real-Time Applications", Network Working Group, RFC 3550, pp. 1-104 (98 total pages).

* cited by examiner

SCHEDULING IN WIRELESS NETWORKS

CROSS REFERENCE TO RELATED APPLICATION

This application is a 35 U.S.C. §371 national stage application of PCT International Application No. PCT/SE2007/000738, filed on 21 Aug. 2007, the disclosure and content of which is incorporated by reference herein in its entirety. The above-referenced PCT International Application was published in the English language as International Publication No. WO 2009/025592 A1 on 26 Feb. 2010.

TECHNICAL FIELD

The present invention generally relates to communication systems, and more particularly to scheduling and resource allocation in wireless networks.

BACKGROUND

In wireless communication systems, the process of scheduling users for communication plays an important role for the overall performance. Scheduling is normally part of the general resource management, and typically involves allocating communication resources, such as the transmission resources of a shared radio medium, to users according to some priority order.

Scheduling is of outmost importance in many wireless applications and system environments such as the IP Multimedia Subsystem (IMS) that supports user-to-user communication services. For example, real-time user-to-user multimedia telephony (MMTel) services play a key role to satisfy the needs of different services and to improve perceptual quality. When a lot of users enjoy the multimedia services concurrently, the available communication resources need to be allocated efficiently. This requires an efficient strategy and implementation for scheduling user access the communication resources.

RELATED ART

Reference [1] relates to delay-based scheduling. Packet data traffic is scheduled based on a ranking metric that varies directly with the mobile station's scheduling downlink transmission rate and a delay factor indicating the staleness of data queued for the mobile station.

Reference [2] describes how users of a shared downlink channel are scheduled efficiently to properly serve the users, while fulfilling local Quality of Service (QoS) requirements such as minimum/maximum throughput and/or delay in the wireless radio access network. In particular, the selection of users is here based on spatial information of users.

Reference [3] relates to a method of scheduling packet data delivery by a communication network node using knowledge of the incoming delays and corresponding end-to-end delay budgets associated with the packet data to be scheduled. The incoming delays may be calculated from packet time information, e.g. timestamps, and/or may be estimated based on call type, network type, network distances/locations, network conditions and so forth.

Reference [4] relates to a scheme for reducing latency by initiating establishment of one or more uplink channels at the ending of a downlink data communication session.

SUMMARY

The present invention overcomes these and other drawbacks of the prior art arrangements.

It is a general object of the present invention to provide an improved strategy for scheduling users for communication in a wireless communication network.

In particular it is desirable to provide a method and arrangement of scheduling users in a wireless sub-network of an overall communication network.

It is also an object of the invention to provide a network node for efficient scheduling of users.

These and other objects are met by the invention as defined by the accompanying patent claims.

A basic idea is to determine scheduling priorities of users based on information representative of experienced end-to-end quality of user communication in an overall network, and allocate communication resources in a wireless sub-network of the overall network to users based on the determined scheduling priorities. For example, the sub-network may be a wireless access network within an overall network, and end-to-end quality information related to the overall network may then be taken into account in the local scheduling procedure in the access network.

In the prior art, users have been allocated communication resources with consideration to Quality of Service (QoS) evaluation only in the local sub-network. By considering information on experienced end-to-end quality, optionally in combination with local quality of service information and/or other factors, the scheduling behavior is generally improved.

In a preferred exemplary embodiment, the end-to-end quality information is based on quality of service (QoS) feedback information extracted from a control protocol associated with the end-to-end transport protocol used for communication within the overall network to provide an estimate of actually experienced end-to-end quality in the overall network.

The invention covers at least a scheduling method, a corresponding scheduling arrangement or system and a network node for scheduling.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Figure 1:
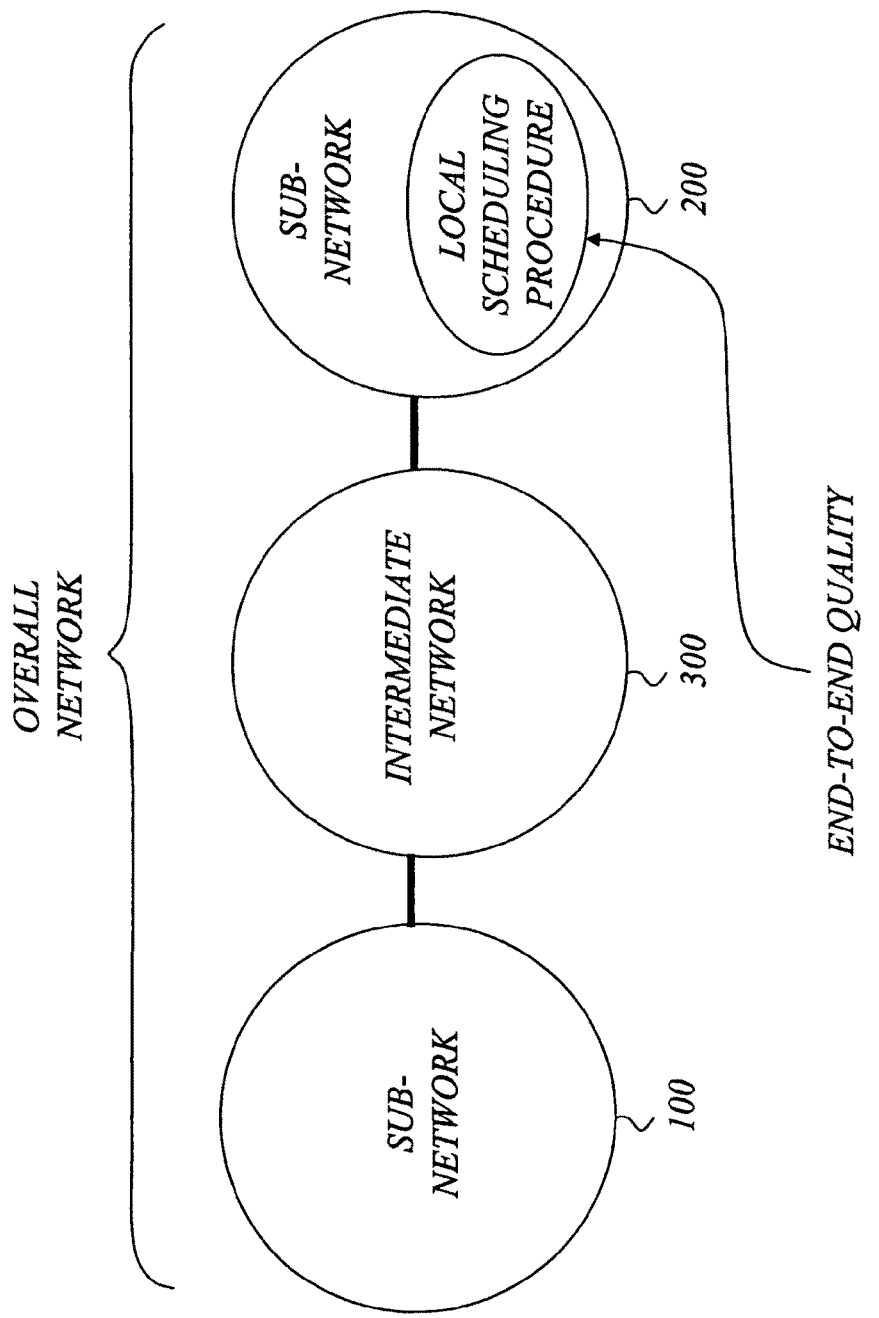
FIG. 1 is a schematic diagram illustrating a basic principle according to a preferred exemplary embodiment of the present invention from a network point of view.

Throughout the drawings, the same reference characters will be used for corresponding or similar elements.

With the increased utilization of communication services such as MMTel services in wireless networks comes the need for efficient allocation of resources to the users.

FIG. 1 is a schematic diagram illustrating a basic principle according to a preferred exemplary embodiment of the present invention from a network point of view. An overall network comprises two sub-networks 100, 200 interconnected via an intermediate network 300. The inventors have recognized that it is beneficial to consider information representative of experienced end-to-end quality of user communication in the overall network when scheduling users for communication in a wireless sub-network of the overall network. This means that information on experienced end-to-end quality related to the overall network will be used in the local scheduling procedure of at least one of the sub-networks. Although merely two sub-networks are illustrated in FIG. 1, it should be understood that the invention can be applied to a network scenario with more than two sub-networks. The sub-networks may be of the same type or of different types. It is also possible to use the invention in a network scenario where only part of the sub-networks support(s) scheduling.

Figure 2:
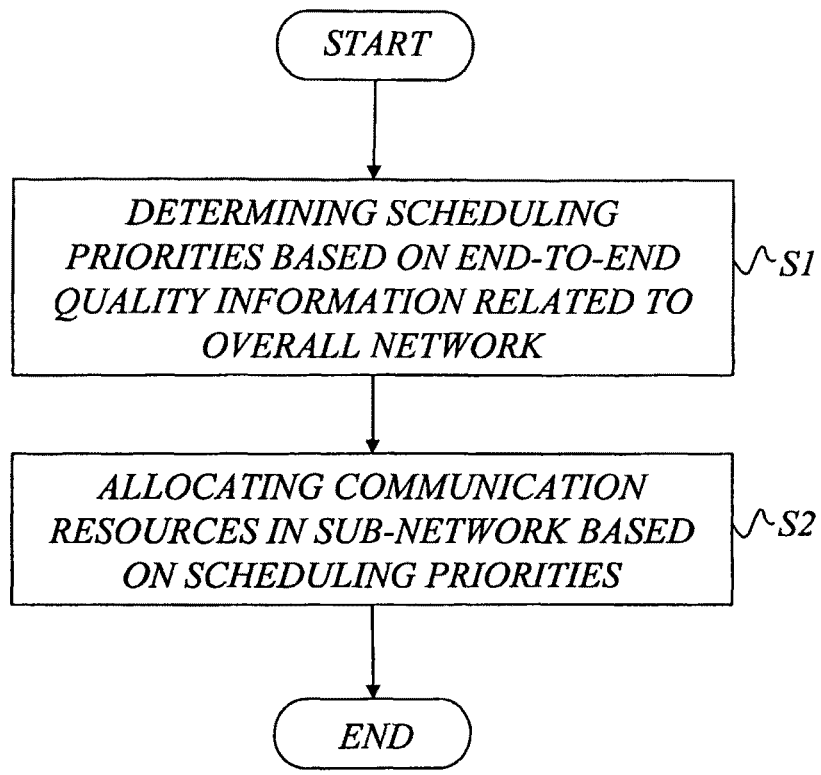
FIG. 2 is a schematic flow diagram of a method according to a preferred exemplary embodiment of the present invention.

In particular, as illustrated in FIG. 2, scheduling priorities of users are determined based on information representative of experienced end-to-end quality of user communication in the overall network (S1). Communication resources in the considered wireless sub-network of the overall network are then allocated to the users based on the determined scheduling priorities (S2). In effect, this means that users are scheduled for communication in the wireless sub-network according to the determined scheduling priorities. Normally, users with higher priority are served first. The communication resources to be allocated in the considered sub-network may for example include transmission resources of a shared radio medium. The end-to-end quality information may for example be related to factors such as the experienced end-to-end delay, end-to-end packet loss and/or end-to-end jitter.

Figure 3:
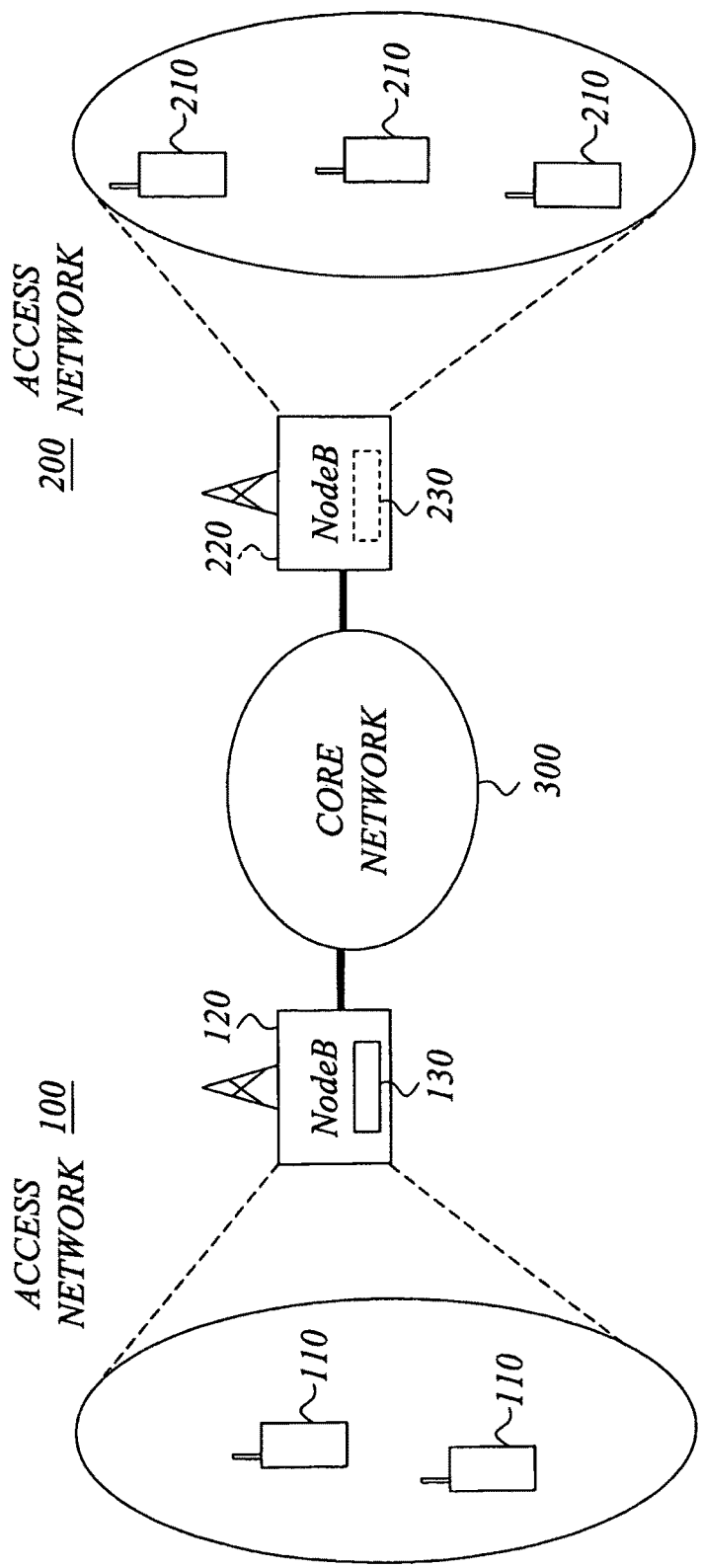
FIG. 3 is a schematic network diagram according to an exemplary embodiment of the present invention.

The sub-networks may for example be wireless access networks interconnected by an intermediate core network, as schematically illustrated in FIG. 3. In this example, each access network 100, 200 comprises a base station 120, 220 such as a NodeB that serves a number of users 110, 210 within a radio coverage area. Information on experienced end-to-end quality of user communication in the overall network (including the interconnected access networks and the intermediate core network) may then preferably be used locally in the uplink and/or downlink scheduling procedures executed by a corresponding scheduler 130, 230 in at least one of the access networks 100, 200.

Although the example of FIG. 3 is primarily targeted at cellular Radio Access Networks (RANs), the considered access networks may be any type of access networks such as Wireless Local Area Networks (WLANs), World Interoperability for Microwave Access (WiMax) based access networks, or even Wireless Personal Area Networks (WPANs). The invention can be applied to network scenarios in which any types of access networks are interconnected through a core network, and end-to-end quality is taken into account in the local scheduling procedure of one or more of the access networks.

For WLAN, for example, there are two different operation modes; Distributed Coordination Function (DCF) mode and Point Coordination Function (PCF) mode. In PCF mode, which is a so-called center control mode, a given center access point will schedule the other nodes for access to the core network. During every contention free period, it is then possible to let the center access point consider one or more end-to-end QoS factors, optionally combined with local QoS factors, when scheduling the node(s) in its domain.

Although the term "user" is normally considered synonymous to, and occasionally referred to as, mobile, mobile station, user equipment, client, subscriber, remote station, user terminal and so forth, it may also relate to other types of nodes in a wireless network.

For a better understanding of the invention, it may be useful to continue with a brief general overview of user scheduling in an exemplary network environment like a modern/future wireless communication system such as High Speed Packet Access (HSPA) or Long Term Evolution (LTE) systems.

In many communication systems, scheduling of users is performed from the network side, and is therefore sometimes referred to as network-based multi-user scheduling. For example, in previous generation systems, scheduling normally worked as an operation unit in the network controller. With HSPA and similar modem systems, scheduling was relocated to Node B.

For example, HSPA is generally based on High Speed Downlink Packet Access (HSDPA) in the downlink and Enhanced Uplink (EUL) in the uplink. The Enhanced Uplink (EUL) is sometimes referred to as High Speed Uplink Packet Access (HSUPA)

HSDPA is an enhancement to WCDMA that provides a smooth evolutionary path to higher data rates. HSDPA is specified in 3GPP release 5, and includes additional transport and control channels such as the High-Speed Downlink Shared Channel (HS-DSCH). EUL is specified in 3GPP release 6 and includes additional transport and control channels such as the Enhanced Dedicated Channel (E-DCH).

HSDPA (High Speed Data Packet Access) enables improvements in capacity and end-user perception by means of efficient sharing of common resources in the cell among many users, rapid adaptation of the transmission parameters to the instantaneous radio channel conditions, increased peak bit rates and reduced delays. Fast scheduling is a mechanism that selects which user(s) to transmit to in a given transmission time interval (TTI). The packet scheduler is a key element in the design of a HSDPA system as it controls the allocation of the shared resources among the users and to a great extent determines the overall behavior of the system. In fact, the scheduler decides which users to serve and, in close cooperation with the link adaptation mechanism, which modulation, power and how many codes should be used for each user. This produces the actual end-users bit rate and system capacity. The HS-DSCH downlink channel is shared between users using channel-dependent scheduling to take advantage of favorable channel conditions in order to make best use of the available radio resources.

Similarly to HSDPA in the downlink, there will be a packet scheduler for E-DCH in the uplink, but it will normally operate on a request-grant principle, where the user equipment (UE) or terminal requests permission to send data and the scheduler on the network side decides when and how many terminals will be allowed to do so. A request for transmission will normally contain data about the state of the transmission data buffer and the queue at the terminal side and its available power margin. The standard foresees two basic scheduling methods. Long term grants are issued to several terminals which can send their data simultaneously using code multiplexation. Short term grants on the other hand allow multiplexing of terminals in the time domain.

As mentioned, scheduling typically involves allocating communication resources to users according to some priority order. The scheduling algorithm generally determines the priorities of the users by using one or more metrics. For example, for MMTel services, the delay in the wireless access network is an important metric. Delay factors and optionally other factors based on radio channel quality are then normally used to grant scheduling priorities to the users. It is known that so-called delay-sensitive schedulers for the downlink can achieve rather good performance for MMTel services such as Voice over IP (VoIP) traffic. For example, reference [1] relates to delay-based scheduling.

Conventional scheduling algorithms such as the Round Robin (RR), Max C/I, Proportional Fair (PF), and delay-based or delay-sensitive scheduling algorithms generally calculate the scheduling priorities for different mobile users according to factors depending on local radio quality and/or the queuing time in HARQ (Hybrid Automatic Repeat ReQuest) queues and so forth. However, these factors are related to the QoS evaluation in the Radio Access Network (RAN) part only. No factors are related to the end-to-end QoS evaluation. The inventors have recognized that this may result in a mismatch of the QoS evaluation between the two different viewpoints.

Figure 4:
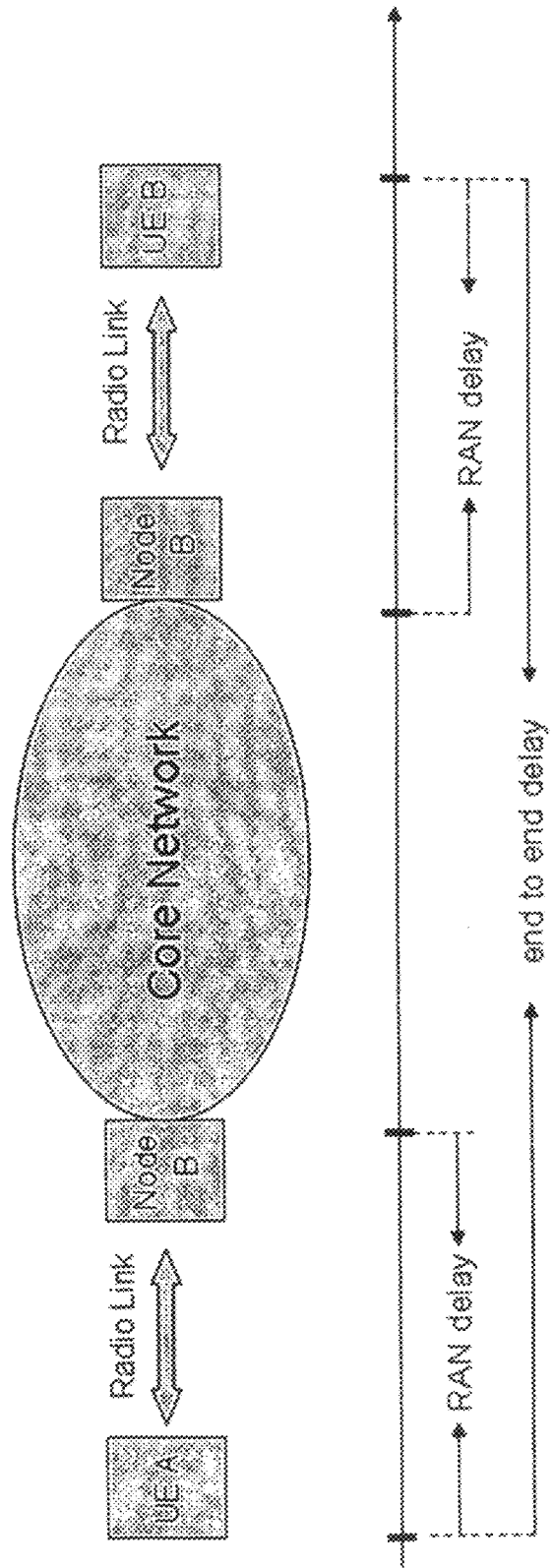
FIG. 4 is a schematic diagram illustrating radio access networks interconnected by an intermediate core network according to an exemplary embodiment of the present invention.

To demonstrate this problem more clearly, an example of delay-based scheduling is shown in FIG. 4. For example, assume that User Equipment (UE) A is communicating with UE B by a VoIP call. For UE A and UE B, the ingoing and outgoing VoIP packets are normally scheduled by the downlink and uplink scheduling units at Node B. The scheduling units normally operate with factors related to the QoS evaluation in the RAN part, such as packet queuing time in the HARQ queues. Then, users with longer queuing time will be served with higher priority. This will help them to reduce the delay in the RAN part. However, users who have shorter RAN packet delay may experience longer end-to-end delay. Further, VoIP perceptual performance, for example, is mainly determined by the end-to-end delay, not the RAN delay. By introducing at least some factor(s) related to the end-to-end QoS experienced in the overall network when scheduling the users, it is possible to achieve a good and reasonable tradeoff between the QoS evaluation in the RAN part and the end-to-end QoS evaluation.

With reference to the example illustrated in FIG. 4, the invention may provide improved uplink or downlink scheduling working at Node B.

Preferably, the scheduling priorities are calculated not only based on the factors related to QoS evaluation in the RAN part, but also based on some factors related to the end-to-end QoS evaluation, such as the experienced end-to-end delay for VoIP traffic. It should be emphasized that under certain circumstances it may be desirable to consider only, or at least primarily, the experienced end-to-end quality of user communication in the overall network. Normally, users experiencing lower end-to-end quality (e.g. longer end-to-end delay or higher end-to-end packet loss) should be granted relatively higher priority in the scheduler. Anyway, by considering end-to-end quality information, and especially when combined with local quality of service information and/or other factors, the underlying basis for the scheduling decisions will generally be improved.

In reference [3], the end-to-end quality aspects are only considered in the form of an end-to-end delay budget, which merely represents a desired target such as a maximum allowed delay. The incoming delay is the accumulated delay up until the base station, and does not include the downlink delay in the radio access network part from the scheduler to the mobile user. In practice, with knowledge of the incoming delays, the downlink scheduler performs scheduling based on the time remaining in the end-to-end delay budget defined for the considered packet data traffic. The remaining period of time before the end-to-end delay budget is exceeded is referred to as the allowable scheduling delay in the downlink scheduler. Packets of those users having a smaller allowable scheduling delay will naturally be given higher priority in the scheduling procedure. Performing scheduling based on the remaining time before an end-to-end delay budget is met is clearly not the same as performing scheduling based on the actual end-to-end delay experienced by user packet data. A budget is merely a target value, and can not show the variation in actually experienced end-to-end delay.

When using both local quality of service information and end-to-end quality information, the invention considers two different granularities of scheduling, so-called inner-loop (local) scheduling and outer-loop (end-to-end) scheduling.

Figure 5:
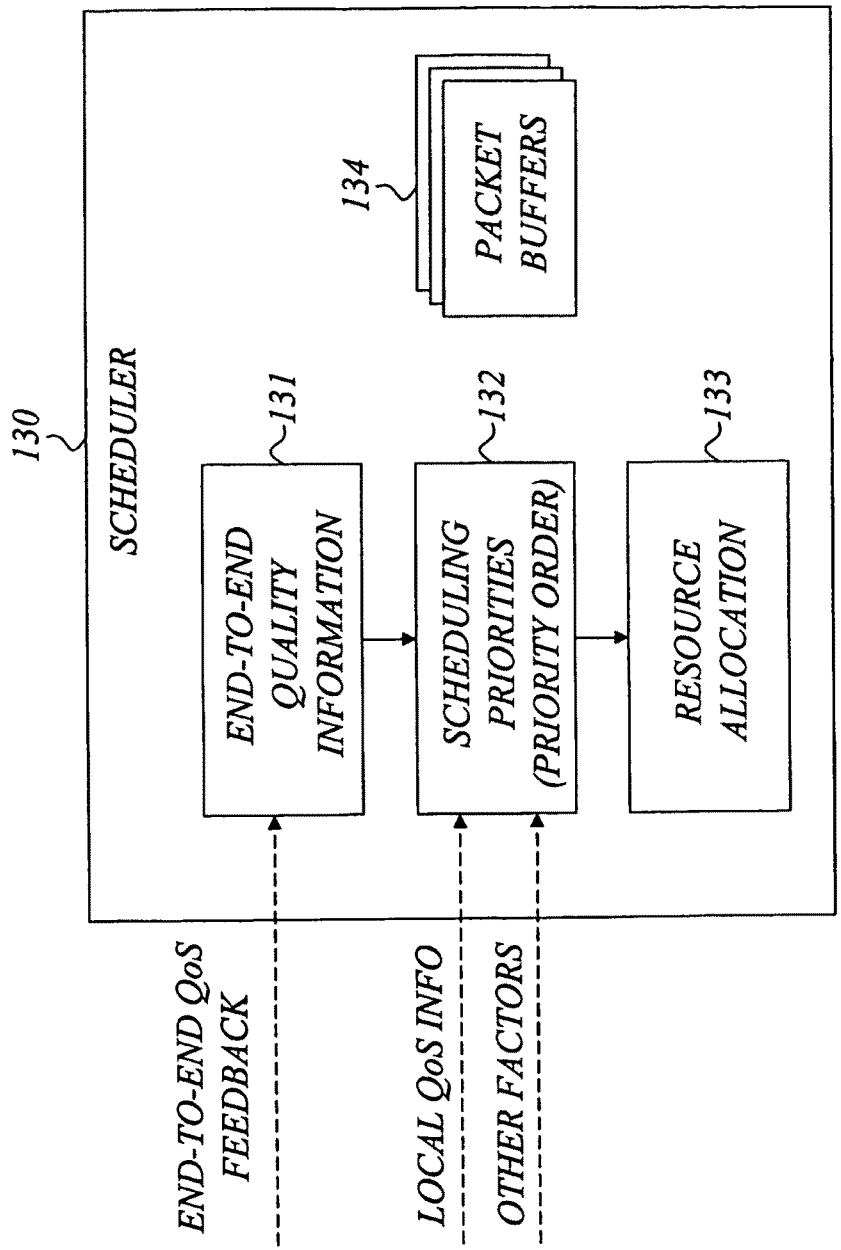
FIG. 5 is a schematic block diagram of a scheduler according to an exemplary embodiment of the invention.

FIG. 5 is a schematic block diagram of a scheduler according to an exemplary embodiment of the invention. In this example, the packet scheduler 130 comprises a unit 131 for compilation and/or estimation of information on experienced end-to-end quality for user communication in the overall network, a prioritization unit 132 for dynamically determining scheduling priorities of the users (i.e. the priority order), a resource allocation unit 133, as well as one or more conventional packet buffers (data queues) 134 for storing packet data of the users. The end-to-end quality information unit 131 may receive end-to-end QoS feedback information. Preferably, this QoS feedback information is extracted from a control protocol associated with the end-to-end transport protocol used for user communication in the overall network. For example, the QoS feedback information will be used for providing an estimate, for each considered user, of actually experienced end-to-end quality in the overall network. This or similar information on experienced end-to-end quality is transferred to the prioritization unit 132, which determines scheduling priorities of the users based on the received information. For example, the experienced end-to-end quality is compared to a corresponding quality (QoS) requirement, normally on a per-user basis, to determine the individual priority of each user. The end-to-end QoS requirement may be set and updated per user. The prioritization unit 132 may optionally use additional information such as local QoS information, user channel quality information as well as other factors in the scheduling procedure. Once the scheduling priorities are determined, the actual resource allocation in the resource allocation unit 133 follows generally accepted technology and is based on detailed information about the shared communication resources as well-known to the skilled person. The user(s) decided to be served during a given scheduling period such as a Transmission Time Interval (TTI) will thus be allocated communication resources for transmission of the corresponding user packet data stored in the packet buffer(s) 134.

The functionality of the scheduler may be distributed between several nodes and/or units, or implemented in a single network node such as a network controller or base station (e.g. Node B).

The invention can be used for allocating communication resources in any wireless sub-network irrespective of the underlying medium access technology (Frequency Division Multiplex, Time Division Multiplex, Code Division Multiplex and/or Space Division Multiplex).

The interested reader may find more information on packet scheduling in the specific context of HSDPA in reference [5].

As indicated above, it may be useful to extract quality of service (QoS) feedback information from a control protocol associated with the end-to-end transport protocol used for communication. In general, a transport protocol provides end-to-end delivery of user data in the overall network, and an accompanying control protocol monitors the end-to-end delivery of user data to provide quality of service (QoS) feedback information with respect to delivered user traffic. According to a preferred exemplary embodiment of the invention, the QoS feedback information is extracted from the control protocol to be able to provide estimates of the experienced end-to-end quality of the users. For example, the scheduler parses control packets of the control protocol to extract the QoS feedback information. Alternatively, the QoS feedback information is extracted on the user side and subsequently delivered from the user side to the scheduling node.

Figure 6:
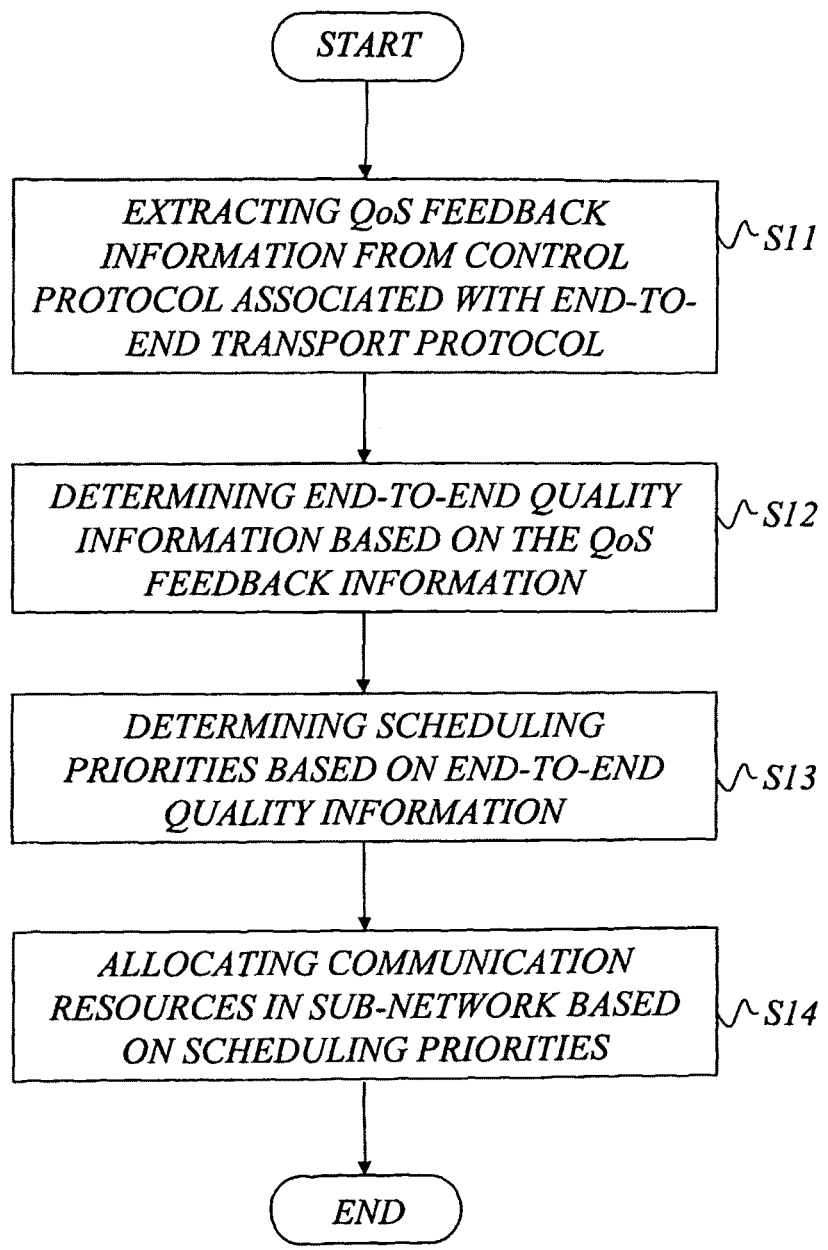
FIG. 6 is a schematic flow diagram of an exemplary method according to a preferred embodiment of the present invention.

FIG. 6 is a schematic flow diagram of an exemplary method using QoS feedback information from a control protocol according to a preferred embodiment of the present invention. In step S11, QoS feedback information for each relevant user is extracted from the control protocol associated with the used end-to-end transport protocol. Next, an estimate of end-to-end quality actually experienced by user packet data in the overall network is determined for each considered user based on the extracted QoS feedback information in step S12. In step S13, the scheduling priorities of the users are determined at least partly based on the estimates of experienced end-to-end quality. Preferably, the scheduling priorities are determined in dependence on the estimates of experienced end-to-end quality such that those users experiencing relatively lower end-to-end quality are granted relatively higher priority. In step S14, the communication resources are allocated according to the determined scheduling priorities.

Naturally, steps S11-S14 may be individually and selectively repeated to provide up-to-date information. In this way, the end-to-end quality information may be changing dynamically, and the scheduling priorities may be adapted accordingly. This will be explained in more detail later on.

In the following, the invention will mainly be described with reference to the Real-time Transport Protocol (RTP) and the accompanying. Real-time Transport Control Protocol (RTCP). It should though be understood that the invention is not limited thereto, and that other end-to-end transport protocols and accompanying control protocols may be used.

For multimedia services, the RTP/RTCP [6] protocol suite is proven to be a very useful transport mechanism. RTP provides the end-to-end delivery services for real-time traffic. But, it can not address the resource reservation and guarantee QoS (quality-of-service) for real-time services. RTCP, however, monitors the delivery of the RTP data, and provides the QoS feedback information with respect to delivered data. In particular, RTCP was designed in order to enable point-to-point reporting of the experienced characteristics of the data flow. In an RTCP report, a number of different characteristics can be reported and there are provisions to use so-called extended RTCP reports (RTCP-XR) which can contain a very large amount of data. The receival of these feedback reports makes it possible for the transmitting application/unit to change its behavior to make better use of the available channel resources.

The inventors have recognized that it would be beneficial for the packet scheduler in a wireless sub-network of the overall end-to-end network to be able to get hold of certain information from the RTCP feedback reports transmitted between communicating users. For this reason it is suggested that the measures are taken to extract end-to-end QoS feedback information from the control packets, e.g. letting the scheduler parse the RTCP control packets or allowing QoS feedback information to be delivered to the scheduler from the user side.

Figure 7:
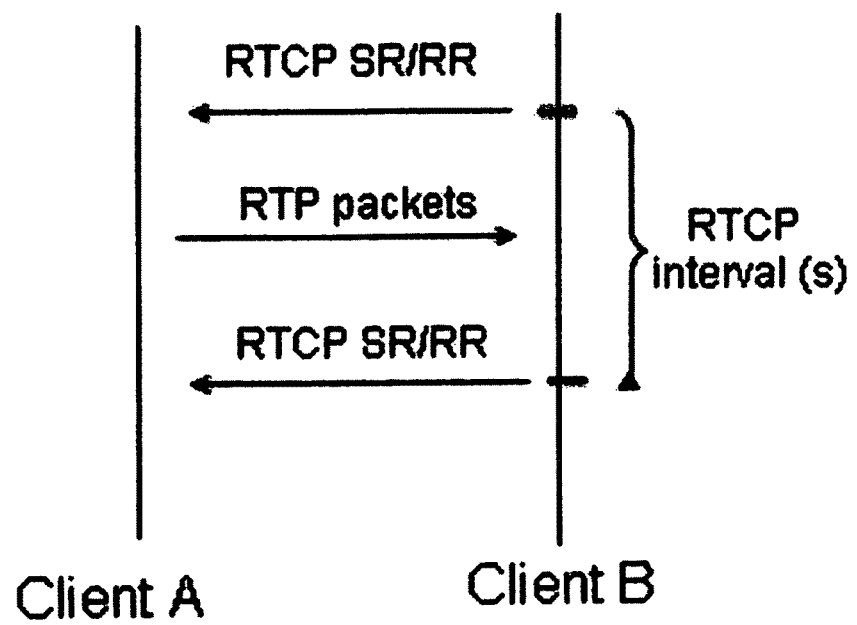
FIG. 7 is a schematic diagram illustrating RTCP packet exchange.
Figure 8:
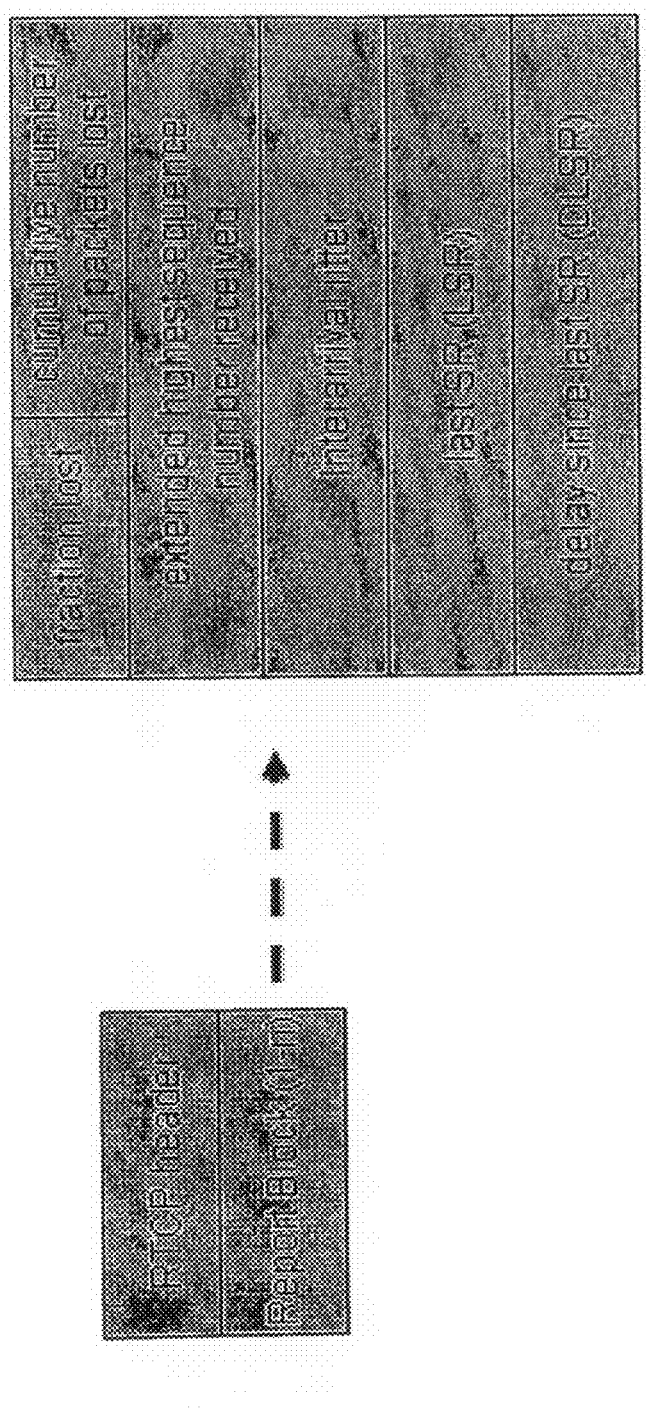
FIG. 8 is a schematic diagram illustrating RTCP RR packet format.

In a preferred exemplary embodiment, the RTCP protocol is suggested to deliver the QoS feedback information for MMTEL and similar services in systems such as HSPA and LTE. Reference [6] gives a detailed definition of RTCP protocol. RTCP defines five types of control packets, in which SR (sender report) and RR (receiver report) include feedback information such as packet loss, jitter and delay information. An example of a basic scenario for the RTCP SR/RR packet exchange between two clients A and B is shown in FIG. 7. The RTCP RR packet format is shown in FIG. 8.

The round trip delay from A to B can generally be estimated by:

$$\text{Roundtrip\_delay} = t_{rev} - LSR - DLSR \quad (1)$$

where $t_{rev}$ denotes the receiving time of the considered RTCP packet, LSR and DLSR are fields in the RR/SR packet indicating last SR and delay since last SR, respectively. The end-to-end delay can for example be estimated roughly by:

$$ETE\_\text{delay} = \text{Roundtrip\_delay}/2. \quad (2)$$

The packet loss and the jitter can also be evaluated from the RTCP feedback information.

It is here assumed that the scheduling node such as the base station or Node B has knowledge about end to end QoS requirements of traffic, like the end to end delay requirement. These QoS requirements may preferably be set per user.

Unfortunately, the RTCP protocol belongs to the transport layer, which is above the network layer. Generally, an RTCP packet will be exchanged between two mobile users, which have an end-to-end RTP-based media communication. The following exemplary solutions can be used for different scenarios respectively:

For LTE systems for example, in 3GPP RAN2, RTCP packets can be parsed directly at eNodeB and the relevant RTCP-related QoS feedback information delivered to the scheduler.

For HSPA system, the RTCP related information can be delivered from the UE to Node B by a protocol extension, which requires a 3GPP specification change.

The update interval of the end-to-end QoS factors may be in the order of seconds such as the RTCP transmission interval, while the scheduler may work in the unit of milliseconds. In order to solve the time mismatch between the end-to-end QoS factor update interval and the scheduler working interval, a similar concept as outer loop and inner loop can be used. Preferably, the scheduling factors for the end-to-end QoS evaluation will be updated when the end-to-end QoS factors are available for the scheduler. In between RTCP transmissions, the scheduling factors will normally be kept unchanged. This means that the end-to-end quality information is preferably updated each RTCP transmission interval, while scheduling is performed, as normal, in each Transmission Time Interval (TTI) of the considered network.

In the following, exemplary embodiments will be described in the context of a wireless or cellular network with central radio resource management and scheduling in which mobile terminals are scheduled in downlink channel and uplink channel.

The cellular network may be exemplified by a Wideband Code Division Multiple Access (WCDMA) network using Enhanced Uplink (EUL) and High Speed Downlink Packet Access (HSDPA). In another scenario, a Long Term Evolution (LTE) mobile system is considered, where the basic uplink and downlink schedulers work at the unit called eNodeB.

Figure 9:
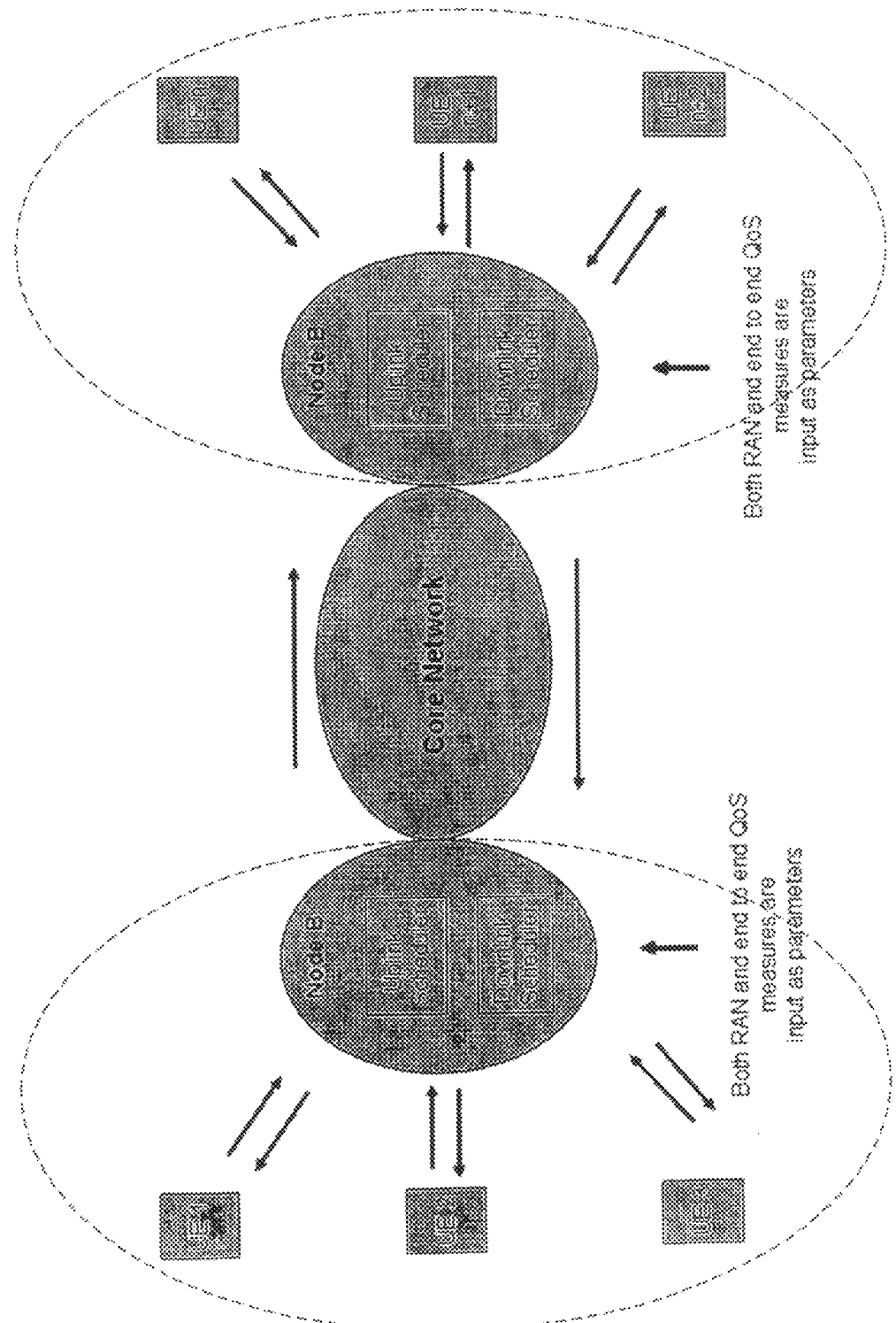
FIG. 9 is a schematic diagram illustrating the improved scheduling policy in uplink and downlink according to an exemplary embodiment of the invention in a wireless network scenario.

In this context, a basic idea is to schedule the users not only based on factors related to the QoS evaluation in the radio access network (RAN), but also based on end-to-end QoS factors, like end-to-end delay, jitter or packet loss. FIG. 9 is a schematic diagram illustrating the improved scheduling policy in uplink and downlink according to an exemplary embodiment of the invention in a wireless network scenario. Basically, two cellular radio access networks are interconnected by a core network. Each access network includes a NodeB/eNodeB or similar base station node, which has functionality for uplink and downlink scheduling of mobile users.

Figure 10:
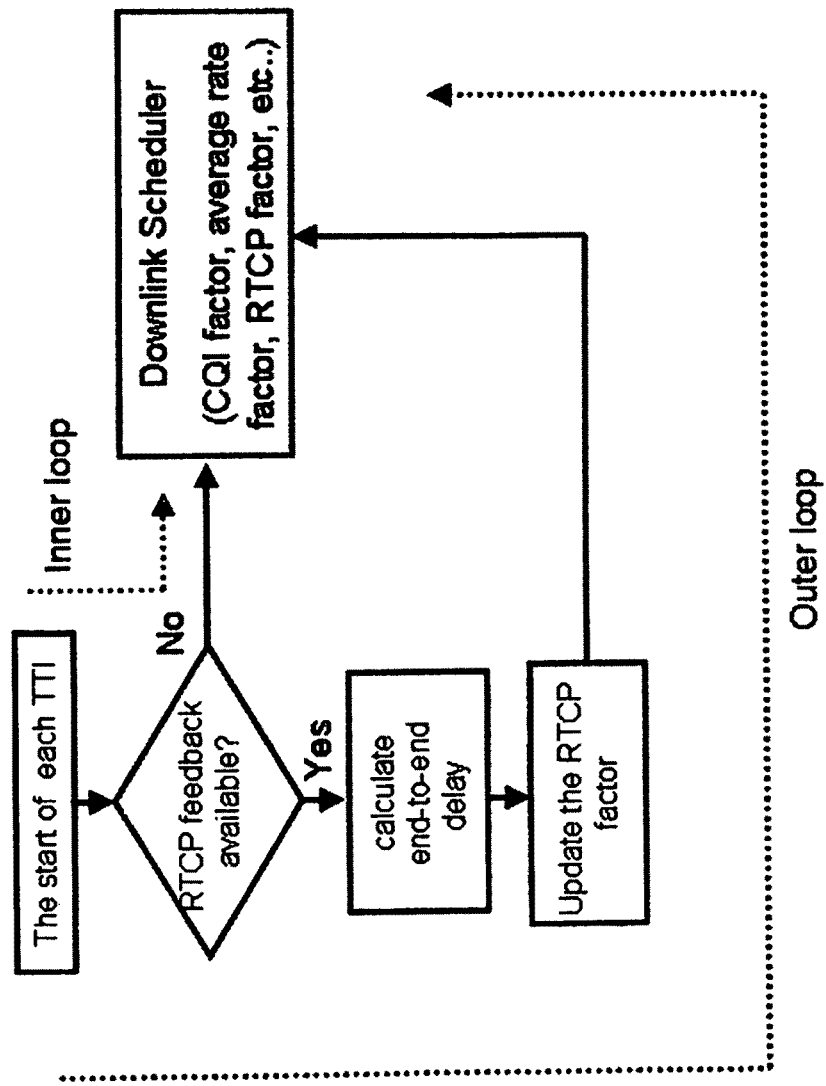
FIG. 10 is a schematic flow diagram illustrating an RTCP based downlink scheduling policy according to an exemplary embodiment of the invention.

FIG. 10 is a schematic flow diagram illustrating an RTCP-based downlink scheduling policy according to an exemplary embodiment of the invention. Preferably, a new kind of RTCP factor is involved in the calculation of the scheduling priorities. Generally, RTCP factors will be updated during each RTCP transmission interval, while the scheduler will work in each TTI. A similar concept as outer loop and inner loop is used. That means that the RTCP factor for end-to-end quality evaluation can be updated only when new, updated RTCP information is available for the scheduler. Otherwise RTCP factor is kept constant. At the start of each TTI it is checked whether new RTCP feedback information is available. If so (Yes), an end-to-end QoS factor such as end-to-end delay is calculated/updated and the RTCP factor updated accordingly. The downlink scheduler will then use (outer loop) the estimated RTCP factor in the scheduling process, preferably together with complementary information such as CQI (channel quality indicator) and average rate factors, and so forth. In the period when no new RTCP feedback is available, the scheduler will use the same RTCP factor unchanged (inner loop) until the next RTCP update.

Figure 11:
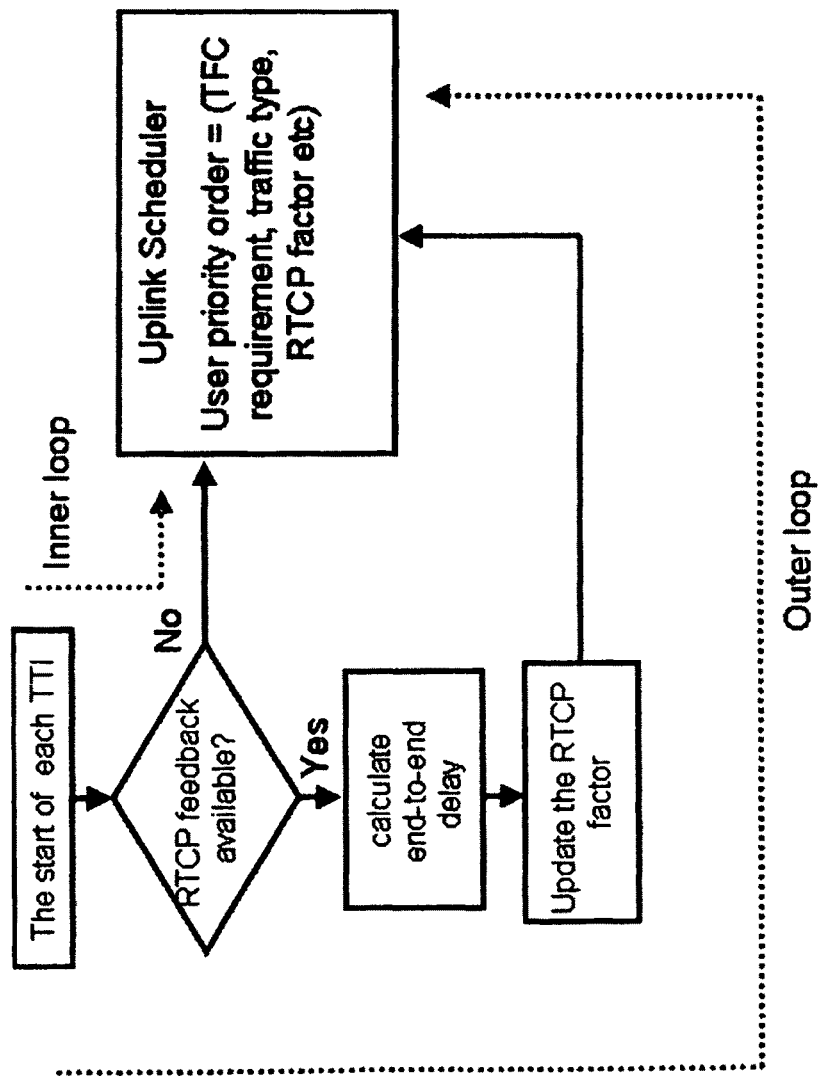
FIG. 11 is a schematic flow diagram illustrating an RTCP based uplink scheduling policy according to an exemplary embodiment of the invention.

The procedure is similar for uplink scheduling, as schematically illustrated in FIG. 11. Traditionally, users with the highest TFC (Transport Format Combination) requirement get the lowest priority, and during each scheduling round, if the cell is overloaded, users with lowest priority are freed by TFC allocation first. Also, if the cell has available TFC resources, users with highest priority are granted with TFC allocation first. For the improved uplink scheduling exemplified in FIG. 11, the user priority order is preferably determined according to TFC requirement in combination with an RTCP factor based on end-to-end QoS information such as end-to-end delay, jitter or packet loss. Optionally, additional information such as traffic type information may also be used in the scheduling procedure.

The invention is applicable in any communication system having central resource management and user scheduling such as network-based multi-user packet scheduling in a wireless access network. As previously mentioned, the invention may for example be useful in HSDPA and LTE systems.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] International Patent Publication WO 2006/055173 A2.
[2] US Patent Application Publication US 2006/0067269 A1.
[3] International Patent Publication WO 2006/130270 A1.
[4] International Patent Publication WO 2006/065174 A1.
[5] "Packet Scheduling and Quality of Service in HSDPA", P. José and A. Gutiérrez, Ph. D. Thesis, October 2003.
[6] "RTP: A Transport Protocol for Real-*Time Applications*", RFC 3550, July 2003.

The invention claimed is:

1. A method of scheduling user terminals for communication in at least two wireless sub-networks of an overall communication network, the method comprising:
    determining scheduling priorities of a number of user terminals based on information representative of experienced end-to-end quality of delivery of user traffic between two of the user terminals which belong to different ones of the wireless sub-networks; wherein said information representative of the experienced end-to-end quality of delivery of the user traffic between the two of the user terminals, is based on quality of service (QoS) feedback information extracted from Real-time Transport Control Protocol (RTCP),
    allocating communication resources in said at least two wireless sub-networks of said overall communication network to said user terminals based on the scheduling priorities, and
    determining a RTCP factor based on the QoS feedback information extracted from the RTCP during each Transmission Time Interval (TTI),
    wherein the scheduling priorities of the number of user terminals are further determined based on the RTCP factor.

2. The method of claim 1, where said-information representative of the experienced end-to-end quality of delivery of the user traffic between the two of the user terminals indicates at least one of: end-to-end delay, end-to-end packet loss, or end-to-end jitter.

3. The method of claim 1, where said determining scheduling priorities is also based on information representative of local quality of communications by one of the user terminals within one of the wireless sub-networks.

4. The method of claim 1, where said information representative of the experienced end-to-end quality of delivery of the user traffic between the two of the user terminals, is based on quality of service (QoS) feedback information extracted from transport format combination (TFC) requirements of said user terminals.

5. The method of claim 1, where said allocating communication resources in said at least two wireless sub-networks of said overall communication network to said user terminals based on the scheduling priorities, allocates at least one of downlink resources or uplink resources.

6. The method of claim 1, where said allocating communication resources in said at least two wireless sub-networks of said overall communication network to said user terminals based on the scheduling priorities, allocates transmission resources of a shared radio medium in at least two radio access networks.

7. The method of claim 1, where said information representative of the experienced end-to-end quality of delivery of the user traffic between the two of the user terminals, is based on quality of service (QoS) feedback information extracted from Real-time Transport Control Protocol (RTCP).

8. A method of scheduling user terminals for communication in at least two wireless sub-networks of an overall communication network, the method comprising:
utilizing a transport protocol to provide end-to-end delivery of user traffic between two of the user terminals which belong to different ones of the wireless sub-networks;
monitoring, using a control protocol associated with the transport protocol, the end-to-end delivery of the user traffic between the two of the user terminals to provide end-to-end quality of service (QoS) feedback information with respect to the end-to-end delivery of the user traffic, wherein the QoS feedback information is extracted from Real-time Transport Control Protocol (RTCP);
determining, for each of the two of the user terminals, an estimate of the experienced end-to-end quality of the delivery of the user traffic between the two of the user terminals based on the end-to-end QoS feedback information;
determining scheduling priorities of the user terminals based on the estimate of the experienced end-to-end quality of the delivery of the user traffic between the two of the user terminals;
allocating communication resources in the at least two wireless sub-networks of the overall communication network to each of the user terminals based on the scheduling priorities; and
determining a RTCP factor based on the QoS feedback information extracted from the RTCP during each Transmission Time Interval (TTI),
wherein the scheduling priorities of the user terminals are further determined based on the RTCP factor.

9. A network node for scheduling user terminals for communication in at least two wireless sub-networks of an overall communication network, said network node comprising:
a first component for determining scheduling priorities of a number of user terminals based on information representative of experienced end-to-end quality of delivery of user traffic between two of the user terminals which belong to different ones of the wireless sub-networks; wherein said information representative of the experienced end-to-end quality of delivery of the user traffic between the two of the user terminals is based on quality of service (QoS) feedback information extracted from Real-time Transport Control Protocol (RTCP); and
a second component for allocating communication resources in said at least two wireless sub-networks of said overall communication network to said user terminals based on the scheduling priorities,
wherein the first component is configured to determine a RTCP factor based on the QoS feedback information extracted from the RTCP during each Transmission Time Interval (TTI), and
wherein the scheduling priorities of the number of user terminals are further determined based on the RTCP factor.

10. The network node of claim 9, where each of the at least two wireless sub-networks is a wireless access network.

11. The network node of claim 9, where the end-to-end transport protocol is implemented to deliver the user traffic between the two of the user terminals and the associated control protocol is implemented to monitor the actual delivery of the user traffic between the two of the user terminals— to provide the quality of service (QoS) feedback information wherein said network node further comprises:
a third component for extracting the quality of service (QoS) feedback information for each of the two of the user terminals from said associated control protocol; and
a fourth component for determining for each the two of the user terminals, an estimate of the experienced end-to-end quality of the delivery of the user traffic between the two of the user terminals based on the quality of service (QoS) feedback information for each of the two of the user terminals.

12. The network node of claim 11, where the first component for determining scheduling priorities is operable for determining said priorities-such that the user terminals experiencing relatively lower end-to-end quality of delivery of user traffic are granted relatively higher priority.

13. The network node of claim 9, where the first component for determining scheduling priorities is to determine said scheduling priorities also based on information representative of local quality of communications by one of the user terminals within one of the wireless sub-networks.

14. The network node of claim 9, where the first component for determining scheduling priorities is to determine said scheduling priorities also based on quality of service (QoS) feedback information extracted from transport format combination (TFC) requirements of said user terminals.

15. The network node of claim 9, where the second component allocates at least one of downlink resources or uplink resources in said at least two wireless sub-networks to said user terminals.

16. The network node of claim 9, where the second component allocates transmission resources of a shared radio medium in the at least two wireless sub-networks to said user terminals.

17. The network node of claim 9, where said network node is a network controller or a base station.

18. A method of scheduling user terminals for communication in at least two wireless sub-networks of an overall communication network, the method comprising:
determining scheduling priorities of a number of user terminals based on information representative of experienced end-to-end quality of delivery of user traffic between two of the user terminals which belong to different ones of the wireless sub-networks, wherein said information representative of the experienced end-to-end quality of delivery of the user traffic between the two of the user terminals is based on quality of service (QoS) feedback information extracted from Real-time Transport Control Protocol (RTCP), and
allocating communication resources in said at least two wireless sub-networks of said overall communication network to said user terminals based on the scheduling priorities of the number of user terminals,
wherein said information representative of the experienced end-to-end quality of delivery of the user traffic between the two of the user terminals, is based on quality of service (QoS) feedback information extracted from transport format combination (TFC) requirements of said user terminals in combination with a RTCP factor for use in the determining of the scheduling priorities of the number of user terminals.

19. A method of scheduling user terminals for communication in at least two wireless sub-networks of an overall communication network, the method comprising:

utilizing a transport protocol to provide end-to-end delivery of user traffic between two of the user terminals which belong to different ones of the wireless sub-networks;

monitoring, using a control protocol associated with the transport protocol, the end-to-end delivery of the user traffic between the two of the user terminals to provide end-to-end quality of service (QoS) feedback information with respect to the end-to-end delivery of the user traffic, wherein the QoS feedback information is extracted from Real-time Transport Control Protocol (RTCP);

determining, for each of the two of the user terminals, an estimate of the experienced end-to-end quality of the delivery of the user traffic between the two of the user terminals based on the end-to-end QoS feedback information;

determining scheduling priorities of the user terminals based on the estimate of the experienced end-to-end quality of the delivery of the user traffic between the two of the user terminals;

allocating communication resources in the at least two wireless sub-networks of the overall communication network to each of the user terminals based on the scheduling priorities of the user terminals; and wherein said information representative of the experienced end-to-end quality of delivery of the user traffic between the two of the user terminals, is based on quality of service (QoS) feedback information extracted from transport format combination (TFC) requirements of said user terminals in combination with a RTCP factor for use in the determining of the scheduling priorities of the user terminals.

20. A network node for scheduling user terminals for communication in at least two wireless sub-networks of an overall communication network, said network node comprising:

a first component for determining scheduling priorities of a number of user terminals based on information representative of experienced end-to-end quality of delivery of user traffic between two of the user terminals which belong to different ones of the wireless sub-networks; wherein said information representative of the experienced end-to-end quality of delivery of the user traffic between the two of the user terminals is based on quality of service (QoS) feedback information extracted from Real-time Transport Control Protocol (RTCP); and a second component for allocating communication resources in said at least two wireless sub-networks of said overall communication network to said user terminals based on the scheduling priorities of the number of user terminals, wherein said information representative of the experienced end-to-end quality of delivery of the user traffic between the two of the user terminals, is based on quality of service (QoS) feedback information extracted from transport format combination (TFC) requirements of said user terminals in combination with a RTCP factor for use in the determining of the scheduling priorities of the number of user terminals.

* * * * *